(12) United States Patent
Liang et al.

(10) Patent No.: US 7,066,742 B2
(45) Date of Patent: Jun. 27, 2006

(54) INFORMATION MEANS WITH WATERPROOF AND TRANSMITTING LIGHT CHARACTERISTIC

(75) Inventors: Yeongchang Liang, Hsin-Chu (CN); Min chang Lin, Zhong-Zheng (CN); Bohong Lin, San-Min (CN)

(73) Assignee: Billionton Systems Inc., Taiwan (CN)

( * ) Notice: Subject to any disclaimer, the term of this patent is extended or adjusted under 35 U.S.C. 154(b) by 0 days.

(21) Appl. No.: 10/532,584

(22) PCT Filed: Oct. 24, 2003

(86) PCT No.: PCT/CN03/00896

§ 371 (c)(1),
(2), (4) Date: Apr. 25, 2005

(87) PCT Pub. No.: WO2004/038570

PCT Pub. Date: May 6, 2004

(65) Prior Publication Data

US 2006/0014430 A1    Jan. 19, 2006

(30) Foreign Application Priority Data

Oct. 25, 2002   (CN) ............................... 02 2 82360

(51) Int. Cl.
*H01R 12/00* (2006.01)
(52) U.S. Cl. ...................... 439/76.1; 439/606; 439/910
(58) Field of Classification Search ............... 439/76.1, 439/606, 276, 936, 910
See application file for complete search history.

(56) References Cited

U.S. PATENT DOCUMENTS

| 5,145,402 | A | * | 9/1992 | Plyler et al. | ................. 439/459 |
| 5,658,170 | A | * | 8/1997 | Tan et al. | .................... 439/610 |
| 6,522,534 | B1 | * | 2/2003 | Wu | ............................ 361/686 |
| 6,561,421 | B1 | * | 5/2003 | Yu | .............................. 235/451 |
| 6,671,808 | B1 | * | 12/2003 | Abbott et al. | ................... 726/4 |
| 2003/0043111 | A1 | * | 3/2003 | Huang | ........................ 345/156 |

FOREIGN PATENT DOCUMENTS

| CN | 1292528 | 4/2001 |
| CN | 2495017 | 6/2002 |
| DE | 20105908 | 6/2001 |
| DE | 20208316 | 6/2002 |
| JP | 203300 | 8/1998 |
| JP | 11007993 | 1/1999 |

* cited by examiner

*Primary Examiner*—Tho D. Ta
(74) *Attorney, Agent, or Firm*—Browdy and Neimark, PLLC

(57) ABSTRACT

An information means with waterproof and transmitting light characteristic is disclosed to include a connector, an electric device connected to the connector for data storage and transmission, a transparent waterproof member surrounding the connector around the electric device for protection against outside water, an outer layer surrounding the waterproof member and a part of the connector and the whole area of the electric device for protection against external heat energy, and a light guide extending from the transparent waterproof member to the outside of the outer layer for guiding light from electric device to the outside for visual check of the operation status of the electric device.

4 Claims, 8 Drawing Sheets

INFORMATION MEANS WITH WATERPROOF AND TRANSMITTING LIGHT CHARACTERISTIC

BACKGROUND OF THE INVENTION

1. Field of the Invention

The present invention relates to information means and more particularly, to a mobile information means with waterproof and transmitting light characteristic for storing or transmitting data that can be used in any of a variety of poor environments, for example, the environment of water, acidum, or alkali, and has visual indication means for enabling the user to check the operation status of the device visually.

2. Description of the Related Art

Various data storage devices such as floppy disk drive, hard disk drive, CD-ROM player, etc. and data transmission devices, such as mobile antenna, etc. are commercially available. These conventional data storage devices and transmission devices must be kept out of water moisture. Penetration of water moisture may cause these data storage and transmission devices to fail. In order to protect these data storage and transmission devices against damage of moisture for a long use, drying apparatus or dehumidifier may be used to provide a dry working environment.

However, electronic apparatus and computers may be used in an environment that cannot be maintained in a dry status of low humility or at locations surrounded by water, gases, acidum, or alkali. In this case, the data storage or transmission devices will wear quickly with use if they are not well protected, resulting in severe damage to the electronic apparatus or computers or causing a catastrophe.

Further, a data storage or transmission device may be used with an electronic apparatus or computer in a dark or spacious place, outdoors, or water area. In this case, the user has to approach to the data storage or transmission device when checking the circuit connection status between the data storage or transmission device and the electronic apparatus or computer. It wastes much time to check the circuit connection status in a spacious or dark place. Further, an illuminator is necessary when checking the circuit connection in the dark.

SUMMARY OF THE INVENTION

The present invention has been accomplished under the circumstances in view. It is therefore the main objective of the present invention to provide an information means, which is practical for use outdoors or under the environment of water, acidum, or alkali for data storage and transmission and, which has visual indication means for enabling the user to quickly and visually check the operation status of the device.

According to one aspect of the present invention, the information means comprises a connector having a plug portion for connection to an external terminal, and a plurality of contacts mounted therein and extending to the plug portion for the contact of the terminal to which the plug portion is connected for transmission of a signal; an electric device connected to the connector for data storage and transmission, which has a circuit electrically connected to the contacts; a waterproof member surrounding the connector around the electric device and filling up gaps in the connector around the contacts and the connection area between the contacts and the electric device; and an outer layer surrounding the waterproof member and a part of the connector and the whole area of the electric device.

According to another aspect of the present invention, the connector is a USB (Universal Serial Bus) connector.

According to still another aspect of the present invention, the waterproof member is made of a material that blocks the transfer of heat energy, having an inner layer surrounding the electric device.

According to still another aspect of the present invention, the electric device comprises a light emitting element; the waterproof member is a transparent member surrounding the electric device; the outer layer has a light guide mounted therein and connected to the waterproof member for guiding light from the light emitting element to the outside of the information means.

According to still another aspect of the present invention, the information means further comprises a waterproof cap surrounding the terminal to which the plug portion is connected, the waterproof cap comprising a body capped on the outer layer around the connector and a water division means extending around an inside wall of the body and forced into engagement with water division means at the outer layer to seal off outside water.

According to still another aspect of the present invention, the outer layer comprises a through hole for hanging.

According to still another aspect of the present invention, the connector comprises a corrosion-proof metal cover around the periphery thereof.

DETAILED DESCRIPTION OF THE INVENTION

Figure 1:
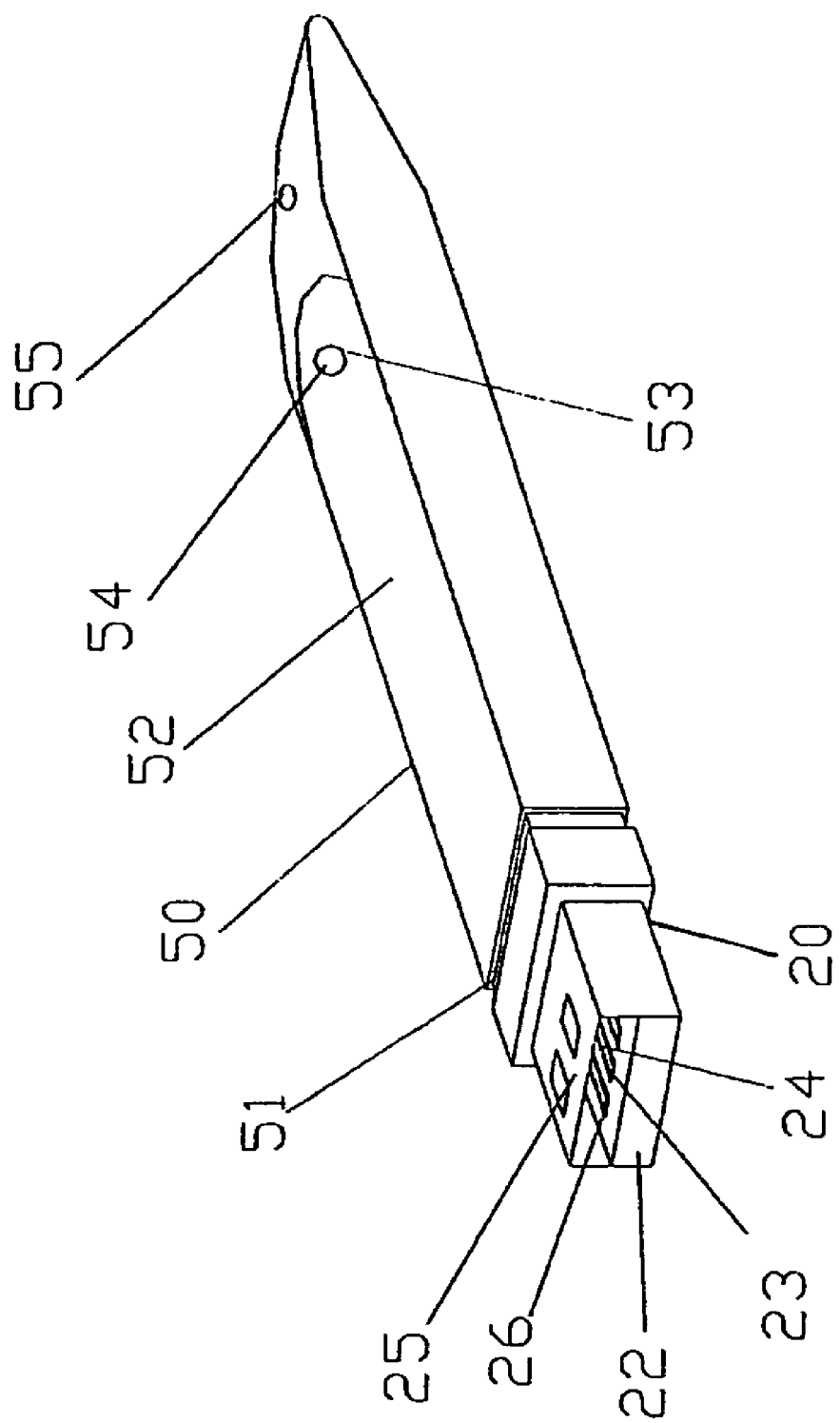
FIG. 1 is a schematic perspective view of the preferred embodiment of the present invention.
Figure 2:
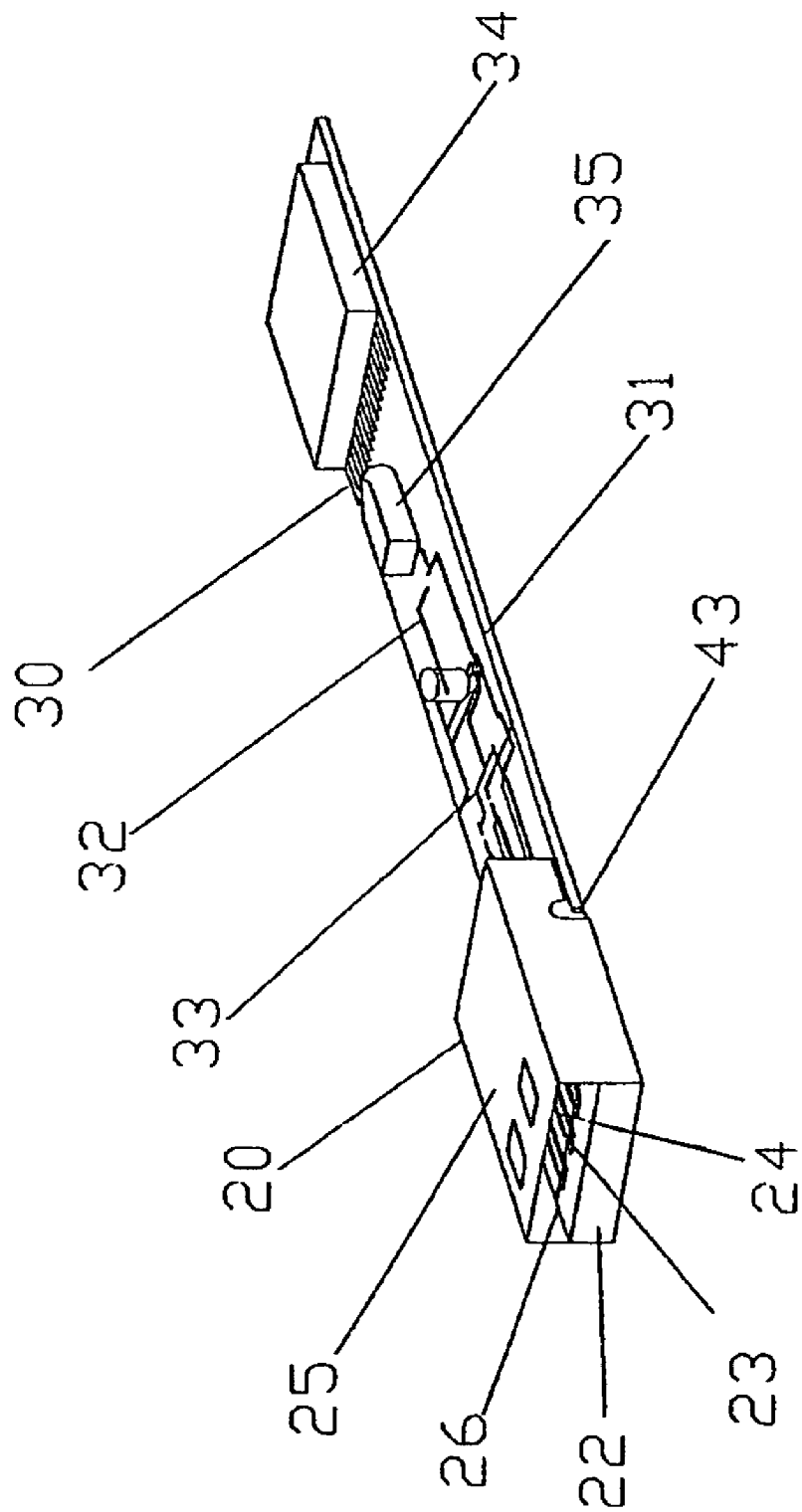
FIG. 2 is a perspective view of a part of the present invention, showing the electric device connected to the connector.
Figure 4:
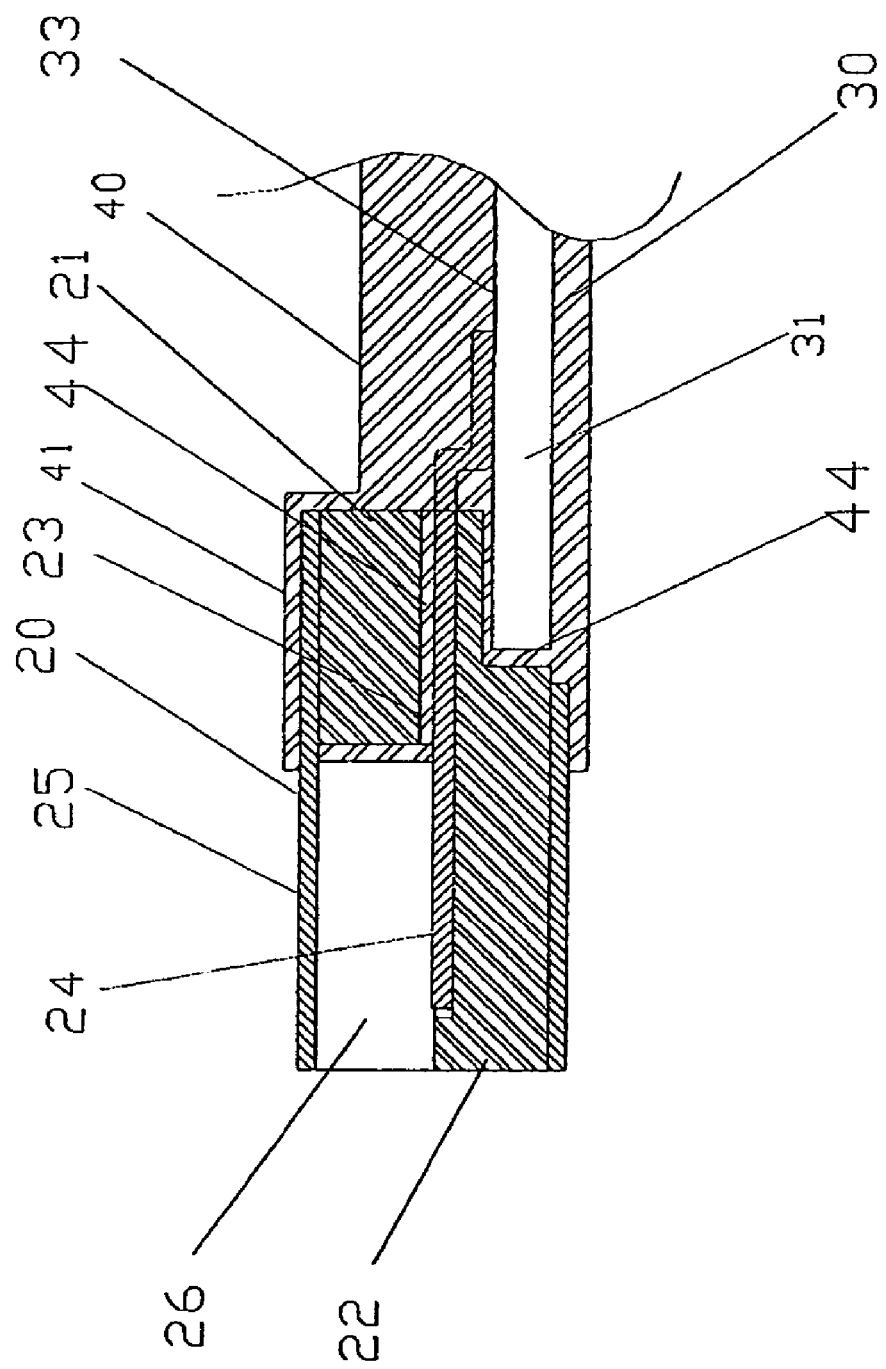
FIG. 4 is an enlarged view of the front part of FIG. 3.

Referring to FIGS. 1, 2 and 4, an information means with waterproof and transmitting light characteristic in accordance with the present invention is shown comprised of a connector 20, an electric device 30, a waterproof member 40, and an outer layer 50.

Figure 3:
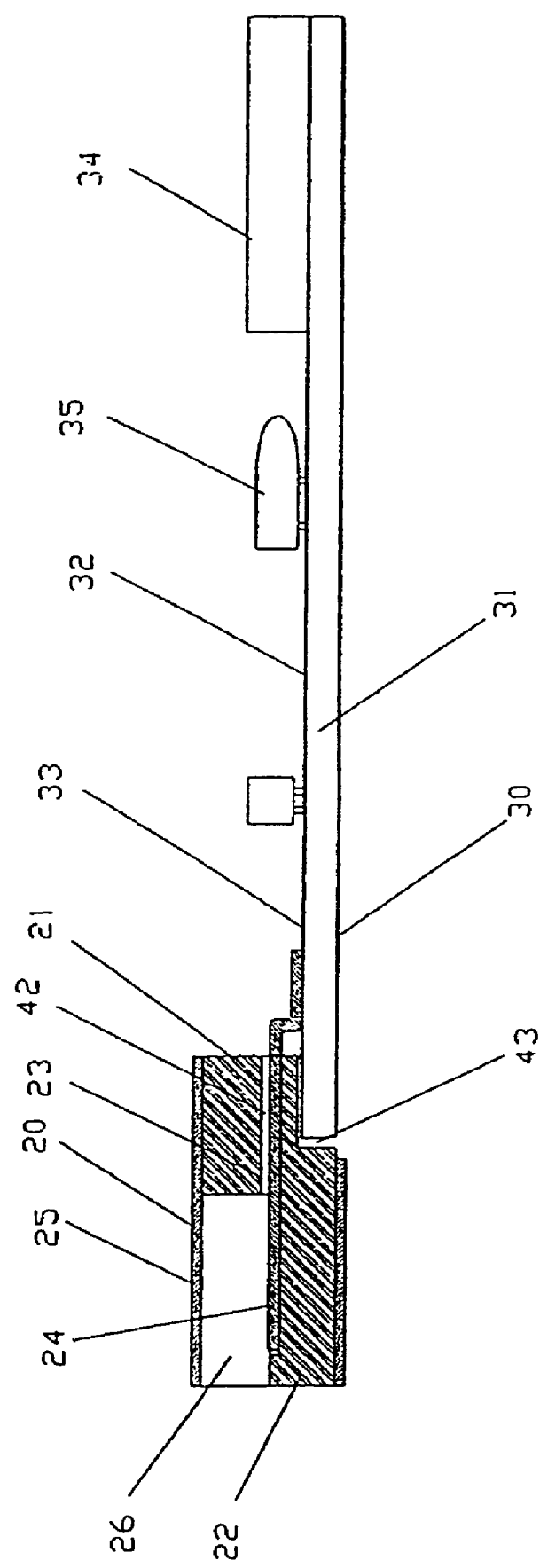
FIG. 3 is a sectional side view of a part of the present invention, showing the electric device connected to the connector, the waterproof layer molded on the connector.

Referring to FIG. 3 and FIG. 2 again, the connector 20 according to the present preferred embodiment is a USB (Universal Serial Bus) connector, comprising a body 21, a relatively thinner plug portion 22 extending from the body 21, a plurality of terminal holes 23 extending through the body 21 to a part of the plug portion 22, a plurality of connection elements, for example, contacts 24 respectively mounted in the terminal holes 23, each contact 24 having one end extending to the plug portion 22 and the other end extending out of the body 21 at a distance opposite to the plug portion 22, and a metal shell 25 surrounding the body 21 and the plug portion 22 and defining with the plug portion 22 a plughole 26. The metal shell 25 can be selected from stainless steel or treated with a special surface treatment to provide acid-proof and alkali-proof characteristics so that the connector 20 can used under the environment of water, acidum and alkali. Alternatively, engineering plastics may be used to make the shell of the connector 20 to surround the body 21 and the plug portion 22, enabling the connector 20 to be used under the environment of water, acidum and alkali.

Referring to FIGS. 2 and 3 again, the electric device 30 comprises a PC board (printed circuit board) 31, which has one end fixedly fastened to the connector 20 adjacent to the protruding part of the contacts 24 of the connector 20 and is printed with an electric circuit 32 and a connecting circuit 33 connecting the electric circuit 32 to the contacts 24 of the connector 20, and a plurality of electronic components 34 installed in the PC board 31 and electrically connected to the electric circuit 32 to provide data storage and data transmission functions. The electronic components 34 include a light emitting element, for example LED (light emitting diode) 35.

Figure 5:
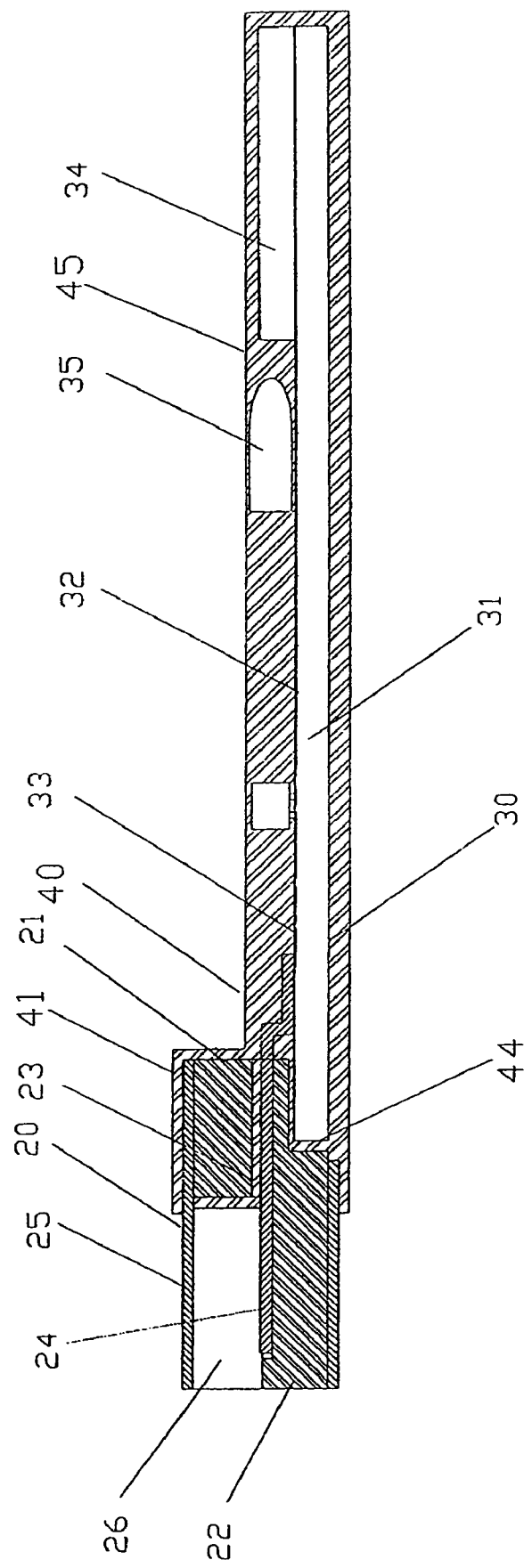
FIG. 5 is a sectional view of a part of the present invention, showing the waterproof layer and inner layer of the waterproof member respectively covered on the connector and the electric device.

Referring to FIG. 5 and FIG. 4 again, the waterproof member 40 is a transparent member capable of blocking the transfer of heat energy, comprising a waterproof layer 41 covered on the connector 20 adjacent to the electric device 30 in a watertight status, and an insertion portion 44 extending from the waterproof layer 41 and tightly engaged into the gap 42 formed of the terminal holes 23 in the connector 20 around the contacts 24 and the gap 43 around the connection area between the connector 20 and the electric device 30 to form a waterproof characteristic, and an inner layer 45 extending from the waterproof layer 41 and covering the PC board 31, the electric circuit 32, the connecting circuit 33 and the electronic components 34 in a watertight manner.

Figure 6:
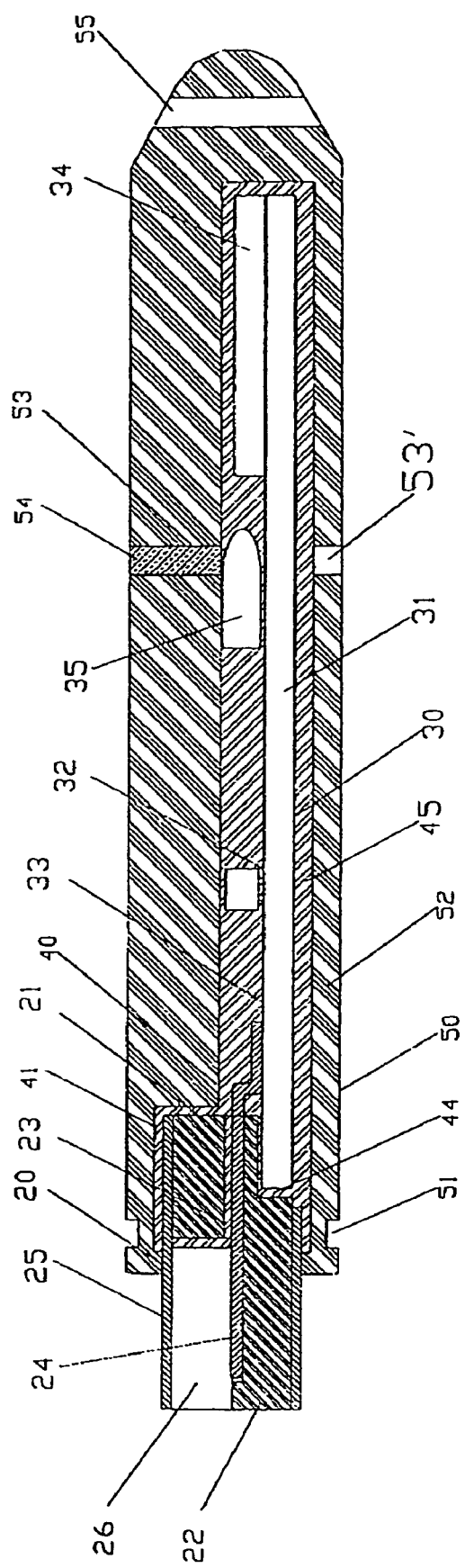
FIG. 6 is a sectional view of the present invention after installation of the outer layer around the connector, the electric device and the waterproof member.

Referring to FIG. 6 and FIG. 1 again, the outer layer 50 is injection-molded from plastics on the waterproof member 40 over the waterproof layer 41 and a part of the connector 20, comprising water division means, for example, a groove 51 extending around the periphery near the front side, a sleeve portion 52 surrounding the whole area of the electric device 30, two small holes 53, 53' extending to the inner layer 35 corresponding to the PC board 31, and at least one light guide 54 fastened to at least one of the small hole 53, 53' for guiding light from the LED 35 to the outside, and a through hole 55 near the rear side of the sleeve portion 52 for hanging.

The assembly process of the present invention is outlined hereinafter with reference to FIGS. 3–6 again. The PC board 31 of the electric device 30 is abutted against a lower part of the rear side of the connector 20, and then the contacts 24 of the connector 20 are curved and respectively soldered to the connecting circuit 33 of the electric device 30, and then the connector 20 and the electric device 30 are tested. After passed the test, the connector 20 and the electric device 30 are covered with the waterproof member 40. The waterproof member 40 is selected from a transparent material capable of blocking the transfer of heat energy. The transparent material is prepared in a molten status that fills up the gap 42 formed of the terminal holes 23 in the connector 20 around the contacts 24 and the gap 43 around the connection area between the connector 20 and the electric device 30. When the transparent material is hardened, an insertion portion 44 is formed integral with the waterproof layer 41 that surrounds the connector 20 to seal the gaps 42, 43, and an inner layer 45 is also formed integral with the waterproof layer 41 and covered over the whole area of the electric device 30.

Referring to FIGS. 1 and 6 again, after the formation of the waterproof layer 40, the connector 20 and the electric device 30 are put in a mold (not shown), and two pins (not shown) are mounted in the mold and stopped against the PC board 31 of the electric device 30 at two sides, and then the selected material is filled in the mold to form the desired outer layer 50 that surrounds a part of the connector 20, the waterproof member 40 and the whole area of the electric device 30. After shape forming, the desired small holes 53, 53' are formed in the outer layer 50 corresponding to the locations of the pins, and the light guide 54 is fastened to one small hole 53 for guiding the light of the LED 35 to the outside so that the user can distinguish the operation status of the electric device 30.

As indicated above, the connector 20 and the electric device 30 are embedded in the transparent material of the waterproof member 40 that is capable of blocking the transfer of heat energy, and the insertion portion 44 of the waterproof member 40 fills up the gap 42 formed of the terminal holes 23 in the connector 20 around the contacts 24 and the gap 43 around the connection area between the connector 20 and the electric device 30, as shown in FIG. 4. Therefore, the waterproof member 40 surrounds the connector 20 and the electric device 30, sealing the connector 20 and the electric device 30 in a watertight status.

Further, the waterproof member 40 provides heat isolation characteristic. When the outer layer 50 is injection-molded from plastics, the outer layer 50 blocks transfer of heat energy from the outer layer 50 toward the inside of the information means. Further, because the waterproof member 40 surrounds the whole area of the electric device 30 and a part of the connector 20 near the electric device 30, the waterproof member 40 well protects the electronic components 34 against external heat energy, keeping material properties and functions of the electronic components 34 normal, thereby improving the yield rate of the fabrication and maintaining the quality of the product.

When the electric device 30 is electrically connected, the LED 35 is turned on to give off light. On the contrary, when the electric device 30 is electrically disconnected, the LED 35 is off. As shown in FIG. 6, the LED 35 is kept in close contact with the inner layer 45. Therefore, the inner layer 45 and the light guide 54 form a light path for enabling the light of the LED 35 to pass to the outside of the information means, as shown in FIG. 1, so that the user can visually check the operation status of the electric device 30 subject to the on/off status of the LED 35.

Nowadays, electronic apparatus and computers have been intensively used in a variety of machines and facilities at different locations and environments. These devices may be used under poor environments, for example, environment of water, acidum, alkali, or gasses. Further, an electronic apparatus or computer requires means for storing or transmitting data. The information means of the present invention has the waterproof member 40 surround the whole area of the electric device 30 and a part of the connector 20 near the electric device 30 to form waterproof characteristic, and the metal shell 25 provide acid-proof and alkali-proof characteristics. Therefore, the information means of the present invention is practical for use as terminal means of an electronic apparatus or computer. By means of the acid-proof and alkali-proof characteristics of the metal shell 25, the information means well protects the electric circuit 32 and connecting circuit 33 of the PC board 31 of the electric device 30 against water, acidum, alkali, and gasses when used under a poor environment.

Further, the on and off status of the LED 35 is determined subject to the on and off status of the electric device 30, and the inner layer 45 forms with the light guide 54 a light path to guide the light of the LED 35 to the outside of the information means. Therefore, the user can visually check the connection, open-circuit or other operation status of the electric device 30 subject to the on/off status of the LED 35. This feature enables the user to check the operation status of the information means under a dark environment. When the information means of the present invention is used with an electronic apparatus or computer in a spacious area, the user can visually check the operation status of the electric device 30 at a remote place.

Figure 7:
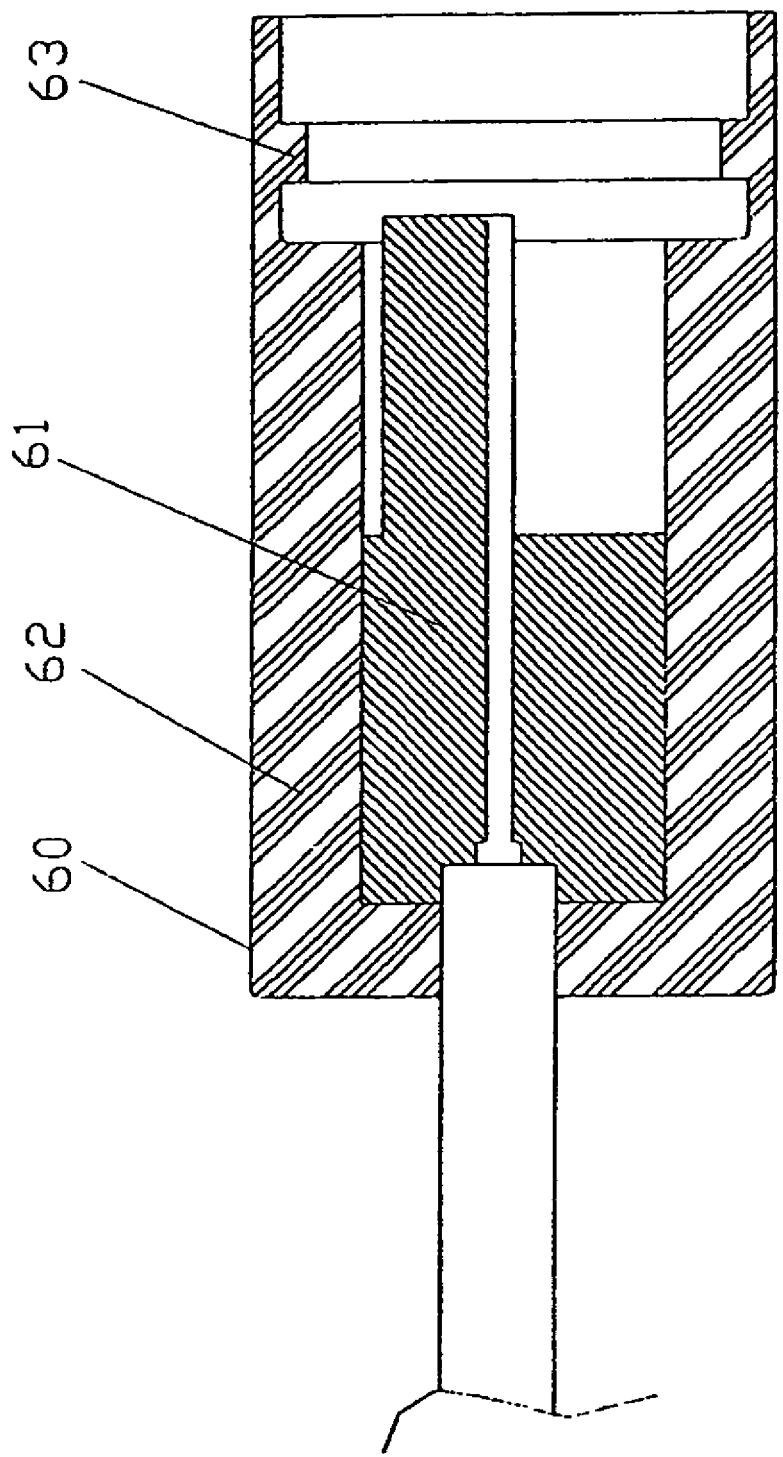
FIG. 7 is a sectional view showing a terminal surrounded within a waterproof cap according to the present invention.
Figure 8:
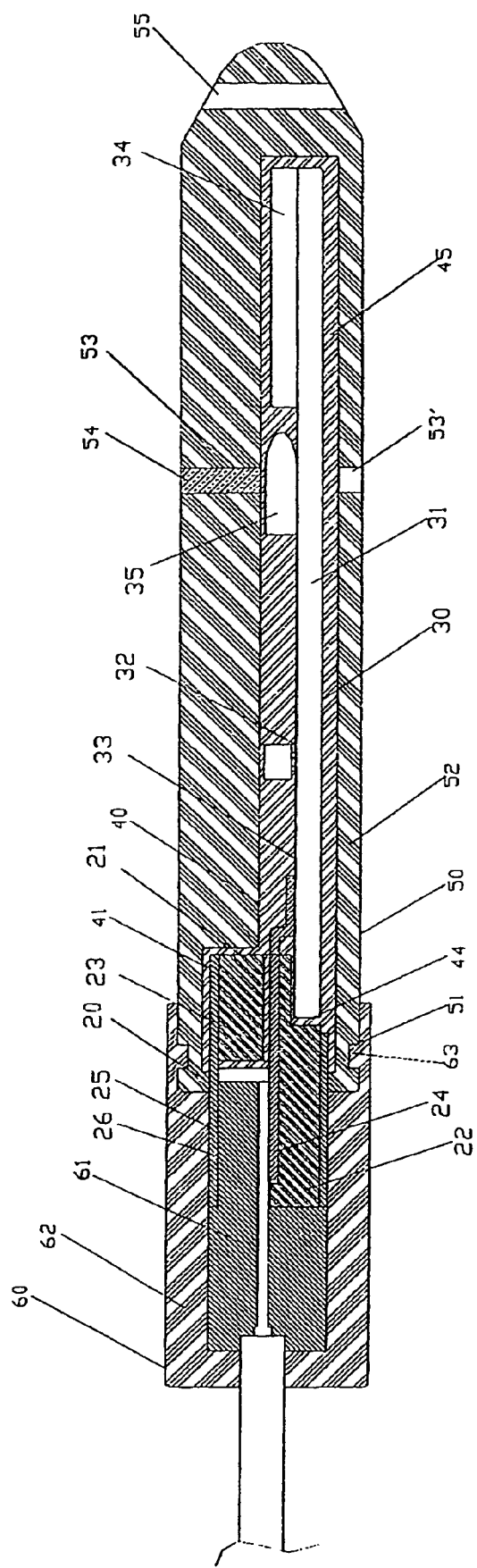
FIG. 8 is a sectional view showing the waterproof cap capped on the connector according to the present invention.

Referring to FIGS. 7 and 8, a waterproof cap 60 is provided surrounding a terminal 61, having a cap body 62 and an annular flange 63 extending around the inside wall of the cap body 62. The annular flange 63 works as division means to stop water. The waterproof cap 60 is capped onto the connector 20 in a watertight status. As shown in FIG. 8, the annular flange 63 is forced into engagement with the annular groove 51, forming a waterproof structure.

Further, the engagement between the annular flange 63 and the annular groove 51 provides an optimum waterproof effect, preventing penetration of outside water into the inside of the information means and the waterproof cap 60. The connector 20 and the waterproof member 40 also provide a waterproof effect. Therefore, the connection area between the terminal 61 and the connector 20 is well protected against outside water and moisture. After connection of the waterproof cap 60 to the outer layer 50, the terminal 61 and the connector 20 and electric device 30 of the information means are kept in a watertight status and well protected against outside water and moisture.

As indicated above, the invention provides an information means with waterproof and transmitting light characteristic, which is formed of a connector, an electric device, a waterproof member and an outer layer for use with a waterproof cap under the environment of water, acidum and/or alkali, and which has visual indication means for visual check of the operation status of the device.

What is claimed is:

1. An information means comprising:
    a universal serial bus connector having a plug portion for connection to an external terminal, and a plurality of contacts mounted therein and extending to said plug portion for the contact of the external terminal to which said plug portion is connected for transmission of a signal;
    an electric device connected to said connector for data storage and transmission, said electric device having a circuit electrically connected to said contacts;
    a waterproof member surrounding said connector around said electric device and tightly engaged in all gaps in said connector around said contacts and the connection area between said contacts and said electric device, said waterproof member being made of a material that blocks the transfer of heat energy, having an inner layer surrounding said electric device; and
    an outer layer surrounding said waterproof member and a part of said connector and the whole area of said electric device;
    wherein said electric device comprises a light emitting element; said waterproof member is a transparent member surrounding said electric device; said outer layer has a light guide mounted therein and connected to said waterproof member for guiding light from said light emitting element to the outside of the information means, and said light guide is located outside said waterproof member.

2. The information means as claimed in claim 1, further comprising a waterproof cap surrounding the terminal to which said plug portion is connected, said waterproof cap comprising a body capped on said outer layer around said connector and a water division means extending around an inside wall of said body and forced into engagement with water division means provided at said outer layer to seal off outside water.

3. The information means as claimed in claim 1, wherein said outer layer comprises a through hole for hanging.

4. The information means as claimed in claim 1, wherein said connector comprises a metal cover around a periphery thereof.

* * * * *